United States Patent
Su et al.

(10) Patent No.: US 10,036,834 B2
(45) Date of Patent: Jul. 31, 2018

(54) CURVED DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Dan Su, Beijing (CN); Jun Wu, Beijing (CN); Jieqiong Wang, Beijing (CN); Wenhai Cui, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 423 days.

(21) Appl. No.: 14/802,639

(22) Filed: Jul. 17, 2015

(65) Prior Publication Data

US 2016/0195646 A1   Jul. 7, 2016

(30) Foreign Application Priority Data

Jan. 6, 2015   (CN) .......................... 2015 1 0004800

(51) Int. Cl.
*G02B 27/02*   (2006.01)
*G02B 3/00*   (2006.01)

(52) U.S. Cl.
CPC .... *G02B 3/0087* (2013.01); *G02B 2003/0093* (2013.01)

(58) Field of Classification Search
None
See application file for complete search history.

(56) References Cited

U.S. PATENT DOCUMENTS

| | | | |
|---|---|---|---|
| 2002/0114151 A1* | 8/2002 | Lee | G02B 6/0055 362/627 |
| 2010/0182222 A1* | 7/2010 | Ichihashi | G02B 5/1857 345/76 |
| 2014/0111713 A1* | 4/2014 | Kizu | G02B 27/26 349/15 |
| 2015/0138484 A1* | 5/2015 | Watanabe | G02F 1/133308 349/58 |

FOREIGN PATENT DOCUMENTS

| | | |
|---|---|---|
| CN | 101243355 A | 8/2008 |
| CN | 103597398 A | 2/2014 |
| CN | 104141912 A | 11/2014 |
| JP | 2011-133672 A | 7/2011 |

OTHER PUBLICATIONS

1st Office action issued in corresponding Chinese application No. 201510004800.5 dated May 10, 2016.

* cited by examiner

*Primary Examiner* — Andrew Coughlin
(74) *Attorney, Agent, or Firm* — Nath, Goldberg & Meyer; Joshua B. Goldberg

(57) ABSTRACT

The present invention provides a curved display device, and relates to the field of display technology. The curved display device comprises a plane display panel and a gradient index lens provided at light exit side of the plane display panel, wherein the gradient index lens makes light exiting from the plane display panel converge toward a center of display surface of the curved display device. In the present invention, by adding a gradient index lens to a traditional plane display panel and using refraction effect of light by the gradient index lens, curved display is achieved without curving the display panel, thus poor display caused by curving the display panel is effectively avoided.

19 Claims, 3 Drawing Sheets

CURVED DISPLAY DEVICE

FIELD OF THE INVENTION

The present invention relates to the field of display technology, and particularly, to a curved display device.

BACKGROUND OF THE INVENTION

With development of display technology, people have more and more visual demand for display products, and curved display products (e.g., curved televisions) gradually become a trend of development.

In the prior art, a curved display device is generally formed by curving a display panel into a certain arc and using a curved backlight source together. However, some defects may be caused when the display panel is curved, for example, defects of light leakage, uneven chroma, etc. may be caused. If curved display may be achieved without curving the display panel, above defects may be avoided, and the present invention is made based on this idea.

SUMMARY OF THE INVENTION

An object of the present invention is to provide a curved display device, in order to achieve curved display without curving a display panel, which reduces risk of occurrence of poor display.

In order to achieve above object, the present invention provides a curved display device comprising a plane display panel and a gradient index lens provided at light exit side of the plane display panel, wherein the gradient index lens makes light exiting from the plane display panel converge toward a center of display surface of the curved display device.

Preferably, the plane display panel has a vertical center axis, and the gradient index lens includes a plurality of refraction sections arranged in parallel to the vertical center axis, and the refraction sections have refractive indexes gradually decreasing from middle position of the gradient index lens to two ends thereof.

Preferably, the refraction sections are arranged symmetrically with respect to the vertical center axis.

Preferably, refractive index distribution constant of the gradient index lens, distance between a viewer located at center of view area and the ends of the gradient index lens, and view angle of the viewer located at the center of the view area meet the following formula:

$$n_N = n_0\left(1 - \frac{A}{2}\left(d\sin\frac{\theta}{2}\right)^2\right),$$

wherein, $n_N$ indicates the refractive index of refraction sections at the ends of the gradient index lens, $n_0$ indicates the refractive index of the refraction section corresponding to position of the vertical center axis, A indicates the refractive index distribution constant of the gradient index lens, d indicates the distance between the viewer located at the center of the view area and the ends of the gradient index lens, and $\theta$ indicates the view angle of the viewer located at the center of the view area.

Preferably, the gradient index lens has a plate shape, and the curved display device further comprises a curved glass provided at the light exit side of the gradient index lens, the curved glass has a plane surface at a side towards the gradient index lens, and has an inward concave surface at a side away from the gradient index lens.

Preferably, a first adhesive strip around an edge of the curved glass is provided on the surface of the curved glass towards the gradient index lens, the curved glass is bonded with the gradient index lens by the first adhesive strip; or, a first transparent adhesive element is provided on the surface of the curved glass towards the gradient index lens, the curved glass is bonded with the gradient index lens by the first transparent adhesive element.

Preferably, the gradient index lens has a plane surface at a side towards the plane display panel, and has an inward concave surface at a side away from the plane display panel.

Preferably, a second adhesive strip around an edge of the gradient index lens is provided on the surface of the gradient index lens towards the plane display panel, the gradient index lens is bonded with the plane display panel by the second adhesive strip; or, a second transparent adhesive element is provided on the surface of the gradient index lens towards the plane display panel, the gradient index lens is bonded with the plane display panel by the second transparent adhesive element.

Preferably, the curved display device further comprises a backlight source for providing a light source for the plane display panel.

Preferably, the backlight source comprises a plurality of optical films of a plate shape.

In the present invention, by adding a gradient index lens to a traditional plane display panel and using refraction effect of light by the gradient index lens, curved display is achieved without curving the display panel, thus poor display caused by curving the display panel is effectively avoided.

BRIEF DESCRIPTION OF THE DRAWINGS

In order to make the present invention understood better, accompanying drawings constitute a part of the specification, and are used for further illustrating the present invention in conjunction with following specific implementations, but the present invention is not limited thereto, and in the drawings.

Figure 1:
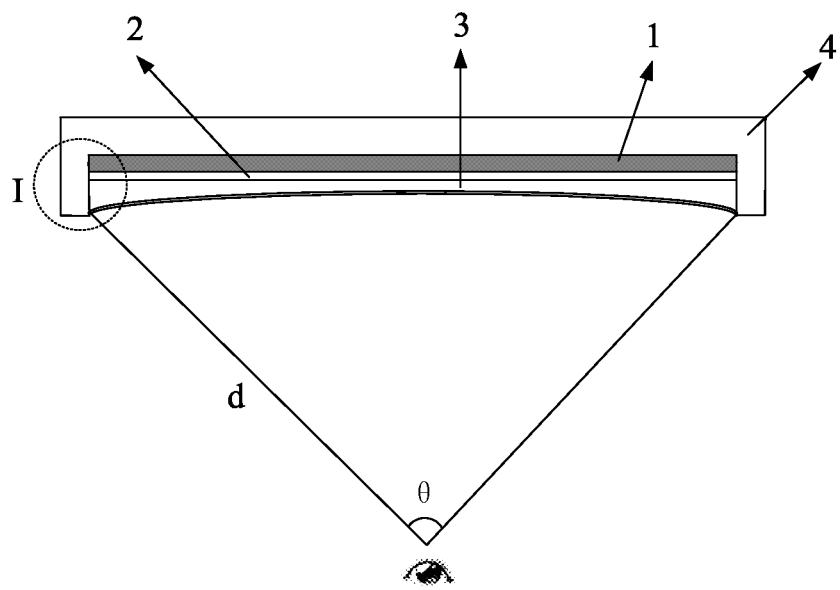
FIG. 1 shows a diagram of a curved display device in accordance with an embodiment of the present invention.

REFERENCE NUMERALS 1, plane display panel; 2, gradient index lens; 3, curved glass; 4, backlight source; 101, vertical center axis; 201, refraction section.

DETAILED DESCRIPTION OF EMBODIMENTS

Hereinafter, the specific implementations of the present invention will be described in detail in conjunction with the accompanying drawings. It should be understood that, the described specific implementations are only used for illustrating and explaining the present invention, and are not used for limiting the present invention.

Figure 2:
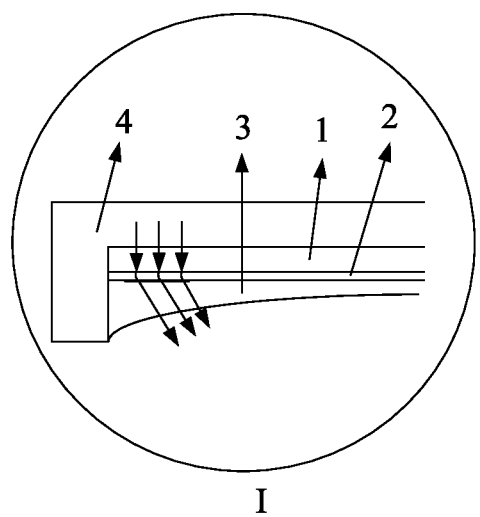
FIG. 2 shows an enlarged diagram of a portion indicated by I in FIG. 1.

The present invention provides a curved display device. FIG. 1 shows a diagram of a curved display device in accordance with an embodiment of the present invention, and FIG. 2 shows an enlarged diagram of a portion indicated by I in FIG. 1. The curved display device comprises a plane display panel 1 and a gradient index lens 2 provided at light exit side of the plane display panel 1, wherein the gradient index lens 2 makes light exiting from the plane display panel 1 converge toward a center of display surface of the curved display device.

In the present invention, by adding a gradient index lens 2 onto a traditional plane display panel 1 and using refraction effect of light by the gradient index lens 2, curved display is achieved without curving the display panel, problems of light leakage, uneven chroma, etc. caused by curving the display panel are effectively avoided, thus risk of occurrence of poor display is reduced.

Figure 3:
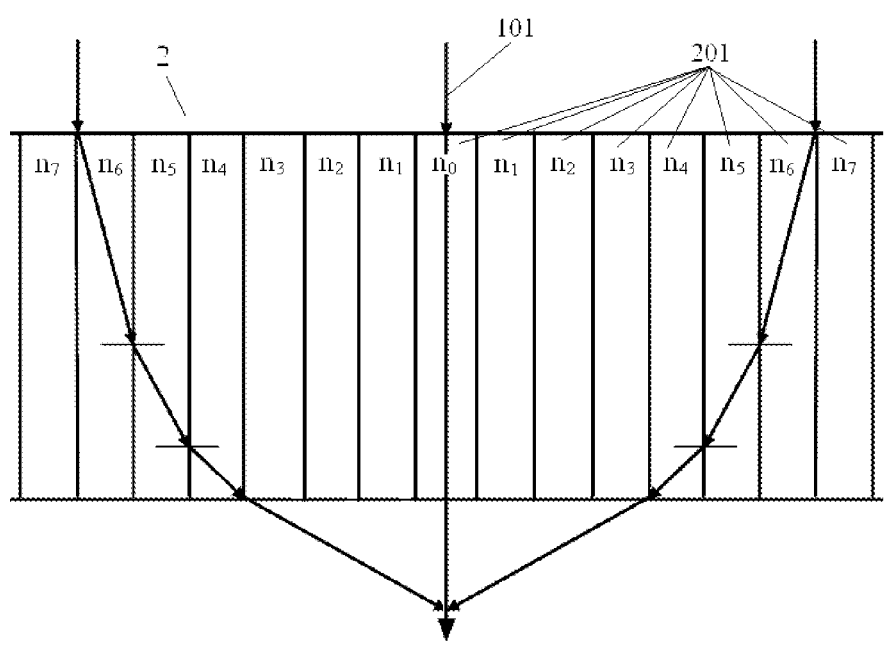
FIG. 3 shows a diagram of a propagation path of light in a gradient index lens.
Figure 4:
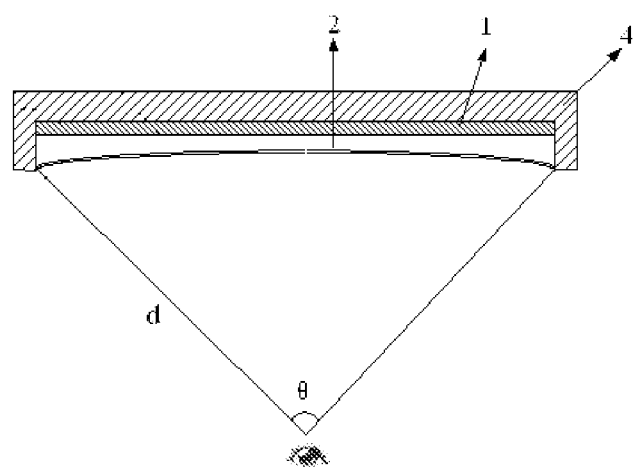
FIG. 4 shows a diagram of a curved display device in accordance with another embodiment of the present invention.

FIG. 3 shows a diagram of a propagation path of light exiting from the plane display panel 1 in the gradient index lens 2, wherein the plane display panel 1 (not shown in FIG. 3) has a vertical center axis 101, the gradient index lens 2 includes a plurality of refraction sections 201 arranged in parallel to the vertical center axis 101, the refraction sections 201 have refractive indexes gradually decreasing from middle position of the gradient index lens 2 to two ends thereof.

In FIG. 3, it is assumed that the refractive index of the refraction section 201 corresponding to the position of the vertical center axis 101 is indicated by $n_0$, and the refractive indexes of the refraction sections 201 arranged from the middle position of the gradient index lens 2 to the two ends thereof are respectively indicated by $n_1$, $n_2$, $n_3$, $n_4$, $n_5$, $n_6$, $n_7$ and so on, thus $n_0 > n_1 > n_2 > n_3 > n_4 > n_5 > n_6 > n_7$. In accordance with refraction law of light, light exiting from the plane display panel 1 gradually converges toward the center of display surface of the curved display device after being refracted by the refraction sections 201, thus a curved display visual effect is experienced by the viewer.

Preferably, the refraction sections 201 are arranged symmetrically with respect to the vertical center axis 101. Here, "symmetrically" means that the refractive indexes of the refraction sections 201 at two different positions being symmetrical with respect to the vertical center axis 101 are the same with each other.

For example, in FIG. 3, refraction sections 201 with refractive indexes of $n_1$, $n_2$, $n_3$, $n_4$, $n_5$, $n_6$, $n_7$ respectively are sequentially arranged at both sides of the vertical center axis 101. Thus, the closer the viewer is distant from the center of the view area of the curved display device, the more apparent the curved display visual effect experienced by the viewer is.

Specifically, the refractive index distribution constant of the gradient index lens 2, the distance between a viewer located at center of view area and the ends of the gradient index lens 2, and view angle of the viewer located at the center of the view area meet the following formula:

$$n_N = n_0\left(1 - \frac{A}{2}\left(d\sin\frac{\theta}{2}\right)^2\right),$$

wherein, $n_N$ indicates the refractive index of refraction sections at the ends of the gradient index lens, $n_0$ indicates the refractive index of the refraction section corresponding to position of the vertical center axis, A indicates the refractive index distribution constant of the gradient index lens, d indicates the distance between the viewer located at the center of the view area and the ends of the gradient index lens, θ indicates the view angle of the viewer located at the center of the view area, and d and θ are as shown in FIG. 1.

It should be noted that, $n_N$, $n_0$, d and θ are given values which are preset when designing the gradient index lens 2. The refractive index distribution constant A of a required gradient index lens 2 is determined in accordance with the above formula, thus the gradient index lens 2 meeting the conditions is selected after determining the refractive index distribution constant A.

In the present invention, the refractive index of each of the refraction sections 201 is set by selecting material of the refraction section 201, so that the gradient index lens 2 satisfies refractive index distribution conditions required by a curved display.

As a first specific implementation of the present invention, as shown in FIG. 1, the gradient index lens 2 has a plate shape, and the curved display device further comprises a curved glass 3 provided at light exit side of the gradient index lens 2, the curved glass 3 has a plane surface at a side towards the gradient index lens 2, and has an inward concave surface at a side away from the gradient index lens 2.

In the present invention, the curved glass 3 is a homogeneous glass, and light in the curved glass 3 propagates along a straight line. Since the curved glass 3 has an inward concave surface at the side facing toward the viewer, the curved display effect is enhanced in vision, thus a better visual perception is experienced by the viewer.

The curved glass 3 may be provided at the light exit side of the gradient index lens 2 by a frame attachment or surface attachment manner. That is, a first adhesive strip around an edge of the curved glass 3 may be provided on the surface of the curved glass 3 towards the gradient index lens 2, and the curved glass 3 is bonded with the gradient index lens 2 by the first adhesive strip; or, a first transparent adhesive element may be provided on the surface of the curved glass 3 towards the gradient index lens 2, and the curved glass 3 is bonded with the gradient index lens 2 by the first transparent adhesive element.

As a second specific implementation of the present invention, the gradient index lens 2 may have a plane surface at the side towards the plane display panel 1, and has an inward concave surface at the side away from the plane display panel 1. In such implementation, a good visual effect of curved display may be achieved without additionally adding a curved glass, and the principle of light propagation is the same as that in the above implementation, which will not be repeatedly described here.

Correspondingly, in the second specific implementation, the gradient index lens 2 may be provided at the light exit side of the plane display panel 1 by a frame attachment or surface attachment manner. That is, a second adhesive strip around an edge of the gradient index lens 2 may be provided on the surface of the gradient index lens 2 towards the plane display panel 1, and the gradient index lens 2 is bonded with the plane display panel 1 by the second adhesive strip; or, a second transparent adhesive element may be provided on the surface of the gradient index lens 2 towards the plane display panel 1, and the gradient index lens 2 is bonded with the plane display panel 1 by the second transparent adhesive element.

It should be noted that, in the first specific implementation, the gradient index lens 2 of a plate shape and the plane display panel 1 may be bonded with each other in any of the above manners, and then the curved glass 3 is attached to the light exit side of the gradient index lens 2.

Further, as shown in FIG. 1, the curved display device further comprises a backlight source 4 for providing a light source for the plane display panel 1. The backlight source 4 comprises a plurality of optical films (e.g., light guide plate, prism sheet, diffusion sheet, etc.) of a plate shape. In other words, in the curved display device of the present invention, only a traditional backlight of a planar form is required, and there is no need to use a curved backlight which is manufactured with technical challenging, resulting in a simplified production process and reduced cost, meanwhile, occurrence of defects caused by physically curving backlight is avoided, and production yield of the curved display device is improved.

It should be understood that, the above implementations are only exemplified to explain the principle of the present invention, but not to limit the present invention. A person skilled in the art can make various variations and modifications without departing from spirit and scope of the present invention, and the variations and the modifications are also considered to be within the protection scope of the present invention.

The invention claimed is:

1. A curved display device, comprising a plane display panel and a gradient index lens provided at light exit side of the plane display panel, wherein the gradient index lens makes light exiting from the plane display panel converge toward a center of display surface of the curved display device, wherein the plane display panel has a vertical center axis, and the gradient index lens includes a plurality of refraction sections arranged in parallel to the vertical center axis, and the refraction sections have refractive indexes gradually decreasing from a middle position of the gradient index lens to two ends thereof, wherein refractive index distribution constant of the gradient index lens, distance between a viewer located at a center of a view area and the ends of the gradient index lens, and view angle of the viewer located at the center of the view area meet the following formula:

$$n_N = n_0\left(1 - \frac{A}{2}\left(d\sin\frac{\theta}{2}\right)^2\right),$$

wherein $n_N$ indicates the refractive index of the refraction sections at the ends of the gradient index lens, $n_0$ indicates the refractive index of the refraction section corresponding to position of the vertical center axis, A indicates the refractive index distribution constant of the gradient index lens, d indicates the distance between the viewer located at the center of the view area and the ends of the gradient index lens, and θ indicates the view angle of the viewer located at the center of the view area, and wherein the refractive index distribution constant A of the gradient index lens to be required is determined in accordance with the formula above so as to select the gradient index lens.

2. The curved display device of claim 1, wherein the refraction sections are arranged symmetrically with respect to the vertical center axis.

3. The curved display device of claim 2, wherein the gradient index lens has a plate shape, and the curved display device further comprises a curved glass provided at the light exit side of the gradient index lens, the curved glass has a plane surface at a side towards the gradient index lens, and has an inward concave surface at a side away from the gradient index lens.

4. The curved display device of claim 3, wherein a first adhesive strip around an edge of the curved glass is provided on the surface of the curved glass towards the gradient index lens, the curved glass is bonded with the gradient index lens by the first adhesive strip; or, a first transparent adhesive element is provided on the surface of the curved glass towards the gradient index lens, the curved glass is bonded with the gradient index lens by the first transparent adhesive element.

5. The curved display device of claim 2, wherein the gradient index lens has a plane surface at a side towards the plane display panel, and has an inward concave surface at a side away from the plane display panel.

6. The curved display device of claim 5, wherein a second adhesive strip around an edge of the gradient index lens is provided on the surface of the gradient index lens towards the plane display panel, the gradient index lens is bonded with the plane display panel by the second adhesive strip; or, a second transparent adhesive element is provided on the surface of the gradient index lens towards the plane display panel, the gradient index lens is bonded with the plane display panel by the second transparent adhesive element.

7. The curved display device of claim 2, further comprising a backlight source for providing a light source for the plane display panel.

8. The curved display device of claim 1, wherein the gradient index lens has a plate shape, and the curved display device further comprises a curved glass provided at the light exit side of the gradient index lens, the curved glass has a plane surface at a side towards the gradient index lens, and has an inward concave surface at a side away from the gradient index lens.

9. The curved display device of claim 8, wherein a first adhesive strip around an edge of the curved glass is provided on the surface of the curved glass towards the gradient index lens, the curved glass is bonded with the gradient index lens by the first adhesive strip; or, a first transparent adhesive element is provided on the surface of the curved glass towards the gradient index lens, the curved glass is bonded with the gradient index lens by the first transparent adhesive element.

10. The curved display device of claim 1, wherein the gradient index lens has a plate shape, and the curved display device further comprises a curved glass provided at the light exit side of the gradient index lens, the curved glass has a plane surface at a side towards the gradient index lens, and has an inward concave surface at a side away from the gradient index lens.

11. The curved display device of claim 10, wherein a first adhesive strip around an edge of the curved glass is provided on the surface of the curved glass towards the gradient index lens, the curved glass is bonded with the gradient index lens by the first adhesive strip; or, a first transparent adhesive element is provided on the surface of the curved glass towards the gradient index lens, the curved glass is bonded with the gradient index lens by the first transparent adhesive element.

12. The curved display device of claim 1, wherein the gradient index lens has a plane surface at a side towards the plane display panel, and has an inward concave surface at a side away from the plane display panel.

13. The curved display device of claim 12, wherein a second adhesive strip around an edge of the gradient index lens is provided on the surface of the gradient index lens towards the plane display panel, the gradient index lens is bonded with the plane display panel by the second adhesive strip; or, a second transparent adhesive element is provided on the surface of the gradient index lens towards the plane display panel, the gradient index lens is bonded with the plane display panel by the second transparent adhesive element.

14. The curved display device of claim 1, wherein the gradient index lens has a plane surface at a side towards the plane display panel, and has an inward concave surface at a side away from the plane display panel.

15. The curved display device of claim 14, wherein a second adhesive strip around an edge of the gradient index lens is provided on the surface of the gradient index lens towards the plane display panel, the gradient index lens is bonded with the plane display panel by the second adhesive strip; or, a second transparent adhesive element is provided on the surface of the gradient index lens towards the plane display panel, the gradient index lens is bonded with the plane display panel by the second transparent adhesive element.

16. The curved display device of claim 1, further comprising a backlight source for providing a light source for the plane display panel.

17. The curved display device of claim 16, wherein the backlight source comprises a plurality of optical films of a plate shape.

18. The curved display device of claim 1, further comprising a backlight source for providing a light source for the plane display panel.

19. A curved display device, comprising a plane display panel and a gradient index lens provided at light exit side of the plane display panel, wherein the gradient index lens makes light exiting from the plane display panel converge toward a center of a display surface of the curved display device,
   wherein the plane display panel has a vertical center axis, and the gradient index lens includes a plurality of refraction sections arranged in parallel to the vertical center axis, and the refraction sections have refractive indexes gradually decreasing from a middle position of the gradient index lens to two ends thereof,
   wherein the refraction sections are arranged symmetrically with respect to the vertical center axis,
   wherein refractive index distribution constant of the gradient index lens, distance between a viewer located at a center of a view area and the ends of the gradient index lens, and view angle of the viewer located at the center of the area meet the following formula:

$$n_N = n_0\left(1 - \frac{A}{2}\left(d\sin\frac{\theta}{2}\right)^2\right),$$

wherein $n_N$ indicates the refractive index of the refraction sections at the ends of the gradient index lens, $n_0$ indicates the refractive index of the refraction section corresponding to position of the vertical center axis, A indicates the refractive index distribution constant of the gradient index lens, d indicates the distance between the viewer located at the center of the view area and the ends of the gradient index lens, and $\theta$ indicates the view angle of the viewer located at the center of the view area, and
   wherein the refractive index distribution constant A of the gradient index lens to be required is determined in accordance with the formula above so as to select the gradient index lens.

* * * * *